US007604848B2

(12) United States Patent
Iwata

(10) Patent No.: US 7,604,848 B2
(45) Date of Patent: Oct. 20, 2009

(54) METHOD FOR FORMING A MARK WITH PIVOTING OF A NOZZLE ABOUT ITS TARGET

(75) Inventor: Yuji Iwata, Suwa (JP)

(73) Assignee: Seiko Epson Corporation (JP)

( * ) Notice: Subject to any disclaimer, the term of this patent is extended or adjusted under 35 U.S.C. 154(b) by 481 days.

(21) Appl. No.: 11/591,413

(22) Filed: Oct. 26, 2006

(65) Prior Publication Data

US 2007/0097198 A1 May 3, 2007

(30) Foreign Application Priority Data

Oct. 28, 2005 (JP) ............................ 2005-315138
Oct. 10, 2006 (JP) ............................ 2006-276856

(51) Int. Cl.
*B29C 71/02* (2006.01)

(52) U.S. Cl. ...................... 427/542; 427/457; 427/541; 427/553; 427/554; 427/555; 427/557; 427/256; 118/641; 118/642; 347/20; 347/37; 347/38; 347/39; 347/51

(58) Field of Classification Search ...................... None
See application file for complete search history.

(56) References Cited

U.S. PATENT DOCUMENTS 4,553,147 A * 11/1985 Slettenmark ................ 347/39
7,059,705 B2 6/2006 Iwata
7,156,515 B2 1/2007 Iwata
2004/0016456 A1 * 1/2004 Murozono et al. .......... 136/250
2004/0226929 A1 * 11/2004 Miura et al. ........... 219/121.85
2007/0097198 A1 5/2007 Iwata

FOREIGN PATENT DOCUMENTS

JP 03292145 A * 12/1991
JP 11-077340 3/1999
JP 2003-127537 5/2003
JP 2005-095849 4/2005

OTHER PUBLICATIONS

English Abstract of KR20040065151 dated Jul. 2004.
English Abstract of KR20040041016 dated May 2004.

* cited by examiner

*Primary Examiner*—Michael Cleveland
*Assistant Examiner*—Joel G Horning
(74) *Attorney, Agent, or Firm*—Harness, Dickey & Pierce, P.L.C.

(57) ABSTRACT

A method for forming a mark includes ejecting a droplet of a liquid from a nozzle onto an ejection target position on a surface of an object along an ejecting direction; radiating a laser beam from a radiation port onto the ejection target position along a radiating direction; and pivoting the nozzle and the radiation port together about the ejection target position as a pivot center, thereby changing the angle between a normal line of the surface of the object and the ejecting direction and the angle between the normal line and the radiating direction while maintaining the angle between the ejecting direction and the radiating direction.

2 Claims, 5 Drawing Sheets

METHOD FOR FORMING A MARK WITH PIVOTING OF A NOZZLE ABOUT ITS TARGET

BACKGROUND

The entire disclosure of Japanese Patent Application No. 2005-315138, filed on Oct. 28, 2005, and Japanese Patent Application No. 2006-276856, filed on Oct. 10, 2006, is expressly incorporated by reference herein.

1. Technical Field

The present invention relates to a method for forming a mark and a liquid ejection apparatus.

2. Related Art

Normally, an electro-optic apparatus such as a liquid crystal display or an electroluminescence display includes a substrate that displays an image. The substrate has an identification code (for example, a two-dimensional code) including product information regarding the name of the manufacturer and the product number, for purposes of quality control and production control. The identification code includes a plurality of dots formed by, for example, colored thin films or recesses. The dots are arranged in a predetermined pattern so that the identification code can be identified in accordance with the arrangement pattern of the dots.

As a method for forming an identification code, JP-A-11-77340 discloses a laser sputtering method and JP-A-2003-127537 discloses a waterjet method. In the laser sputtering method, a code pattern is formed through sputtering by radiating a laser beam onto a metal foil. In the waterjet method, dots are marked on a substrate by ejecting water containing abrasive onto the substrate.

However, in the laser sputtering method, the interval between the metal foil and the substrate must be adjusted to several micrometers to several tens of micrometers in order to form each dot in a desired size. The substrate and the metal foil thus must have extremely flat surfaces and adjustment of the interval between the substrate and the metal foil must be carried out with accuracy on the order of micrometers. This limits application of the method to a restricted range of substrate, and the use of the method is limited. In the waterjet method, the substrate may be contaminated by water, dust, and the abrasive that are splashed when the identification code is formed.

In order to solve these problems, an inkjet method has been focused on as an alternative method for forming an identification code. In the inkjet method, dots are provided on a substrate by ejecting droplets of liquid containing metal particles from nozzles of an ejection head onto the substrate. The droplets are then dried to provide the dots. The method thus can be applied to a relatively wide range of substrate materials. Further, the method prevents contamination of the substrate caused by formation of the identification code.

However, the inkjet method may cause the following problem in correspondence with the surface condition of a substrate or surface tension of a droplet. Specifically, immediately after having been received by a substrate, a droplet starts to spread wet on the surface of the substrate. Thus, if the time necessary for the droplet to be dried is excessively long (for example, 100 milliseconds or longer), the droplet may spread excessively on the surface of the substrate and overflow from the corresponding data cell. This makes the code pattern unreadable, which causes loss of the information regarding the substrate.

This problem may be avoided by radiating a laser beam onto the droplet on the substrate and instantly drying the droplet. However, in a typical liquid ejection head, the interval between the nozzles and the surface of the substrate is maintained at several millimeters to improve position accuracy of reception of an ejected droplet by the substrate. The laser beam thus must be radiated onto the droplet toward the narrow distance between the ejection head and the substrate immediately after the droplet has been received by the substrate. That is, it is necessary to greatly incline the optical axis of the laser beam with respect to a normal direction of the surface of the substrate. Accordingly, the optical cross section of the laser beam, or a beam spot, with respect to the surface of the substrate or the droplet becomes excessively large on the surface of the substrate. This may lower the radiation intensity of the laser beam or the position accuracy of radiation of the laser beam.

SUMMARY OF THE INVENTION

Accordingly, it is an objective of the present invention to provide a method for forming a mark and a liquid ejection apparatus that improve controllability for shaping the mark formed by droplets of liquid by maintaining the position accuracy of reception of ejected droplets by a substrate and that of the radiation of laser beams.

According one aspect of the invention, a method for forming a mark includes ejecting a droplet of a liquid from a nozzle onto an ejection target position on a surface of an object along an ejecting direction; radiating a laser beam from a radiation port onto the ejection target position along a radiating direction; and pivoting the nozzle and the radiation port together about the ejection target position as a pivot center, thereby changing the angle between a normal line of the surface of the object and the ejecting direction and the angle between the normal line and the radiating direction while maintaining the angle between the ejecting direction and the radiating direction.

According to another aspect of the invention, a liquid ejection apparatus includes a liquid ejection head, a laser radiation device, and a pivot device. The liquid ejection head has a nozzle. The liquid ejection head ejects a droplet of a liquid from the nozzle onto an ejection target position on a surface of an object along an ejecting direction. The laser radiation device has a radiation port. The laser radiation device radiates a laser beam from the radiation port onto the ejection target position along a radiating direction. The pivot device pivots the nozzle and the radiation port together about the ejection target position as a pivot center, thereby changing the angle between a normal line of the surface of the object and the ejecting direction and the angle between the normal line and the radiating direction while maintaining the angle between the ejecting direction and the radiating direction.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 6. First, a liquid crystal display 1 having an identification code formed by a method for forming a mark according to the present invention will be explained.

Figure 1:
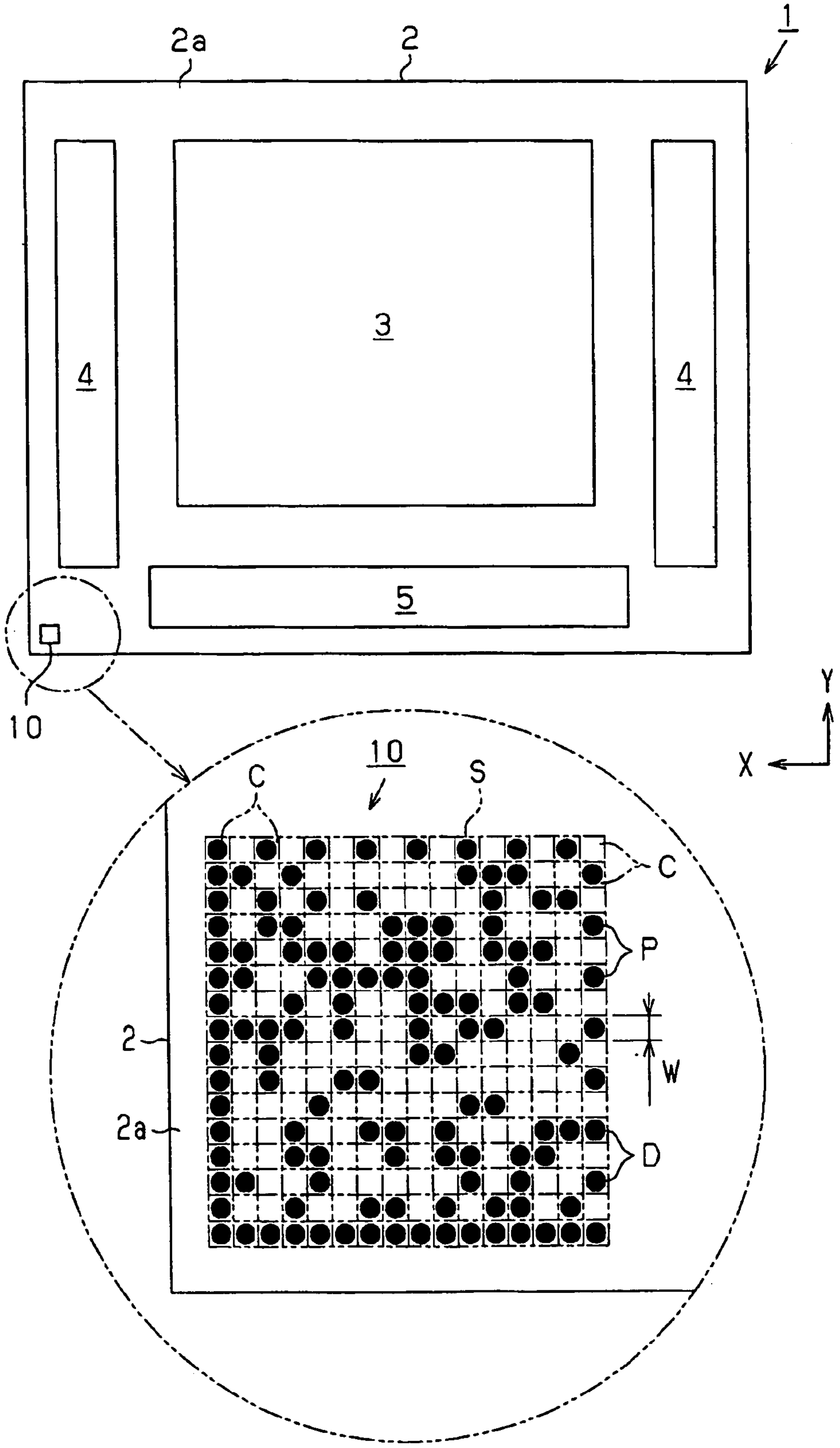
FIG. 1 is a plan view illustrating a liquid crystal display.

As illustrated in FIG. 1, a display portion 3 is formed on one of the surfaces of a substrate 2 of the liquid crystal display 1, or on a surface 2*a*. The substrate 2 is an object onto which droplets of liquid are ejected. The display portion 3 has a rectangular shape. Liquid crystal molecules are sealed in a substantial central portion of the display portion 3. The surface 2*a* receives droplets of liquid that have been ejected. A scanning line driver circuit 4 and a data line driver circuit 5 are formed outside the display portion 3. The liquid crystal display 1 controls orientation of the liquid crystal molecules in the display portion 3 in correspondence with scanning signals generated by the scanning line driver circuit 4 and data signals generated by the data line driver circuit 5. The liquid crystal display 1 modulates area light emitted from a lighting device (not illustrated) in accordance with an orientation state of the liquid crystal molecules, thus displaying a desired image in an area of the display portion 3.

Referring to FIG. 1, a code formation area S (indicated by the circle in the double-dotted chain line), a square each side of which is approximately 1 mm long, is defined in the lower left corner of the surface 2*a*. The code formation area S is virtually divided into data cells C of 16 rows by 16 lines. A dot (or a mark) D is formed in each of some selected data cells C. The dots D are arranged in accordance with a prescribed pattern, forming an identification code 10 of the liquid crystal display 1.

In the first embodiment, an ejection target position P corresponds to the center of each of the data cells C in which the dots D are provided. The cell width W is the length of each side of the data cell D.

Each dot D has a semispherical shape with an outer diameter coinciding with the length of each side of the data cell C, or the cell width W. To form the dots D, droplets Fb of liquid F (see FIG. 4) prepared by dispersing metal particles (for example, nickel or manganese particles), or dot forming material, in dispersion medium are ejected onto the selected data cells C. The droplets Fb are then dried and baked in the corresponding data cells C. Such drying and baking of the droplets Fb is performed through radiation of laser beams B .(see FIG. 5). In the first embodiment, the dots D are formed by drying and baking the droplets Fb. However, formation of the dots D may be carried out in any other suitable manner. For example, the dots D may be provided simply by drying the laser beams B.

The identification code 10 may reproduce product information of the liquid crystal display 1 including the product number or the lot number in accordance with the pattern formed by the dots D in the data cells C.

In FIGS. 1 to 5, direction X corresponds to a longitudinal direction of the substrate 2. Direction Y corresponds to a lateral direction of the substrate 2, or a direction perpendicular to direction X. Direction Z is a direction vertical to directions X and Y. Specifically, the directions indicated by the arrows of the drawings will be referred to as defined as direction +X, direction +Y, and direction +Z. The directions opposite to these directions will be referred to as direction −X, direction −Y, and direction −Z.

Figure 2:
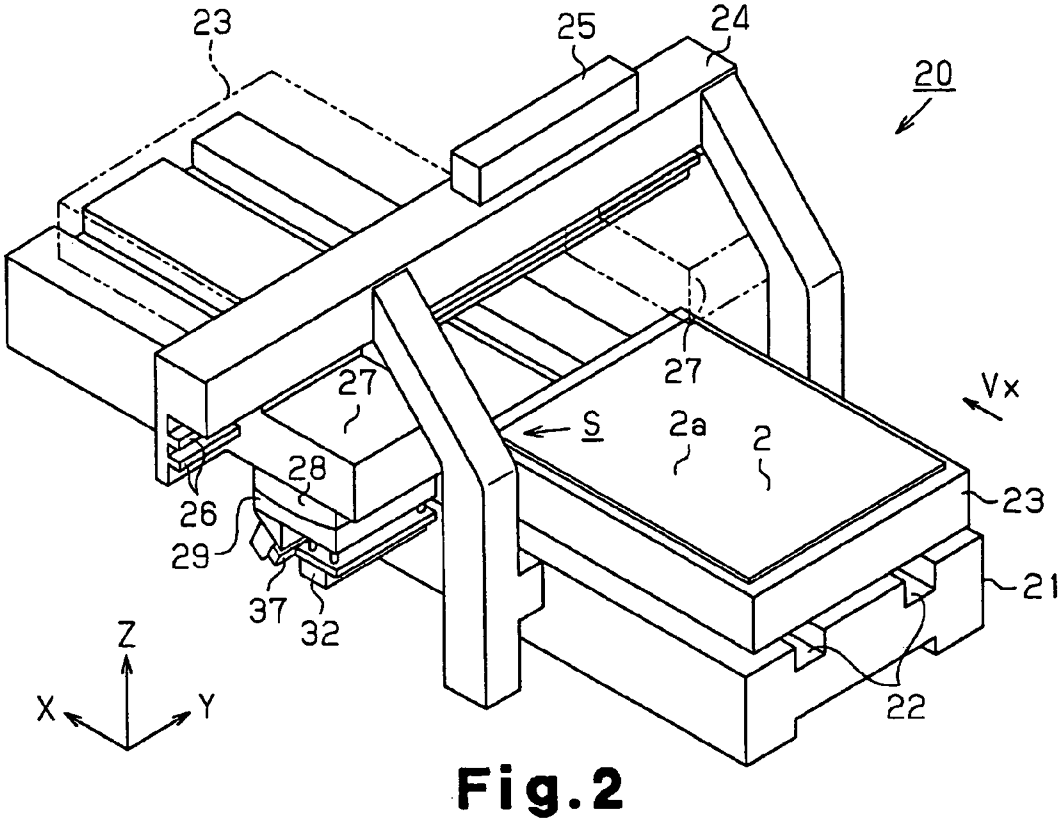
FIG. 2 is a perspective view schematically illustrating a liquid ejection apparatus.

Next, a liquid ejection apparatus 20 by which the identification code 10 is formed will be explained. As illustrated in FIG. 2, the liquid ejection apparatus 20 has a base 21. The base 21 is formed in a parallelepiped shape and the longitudinal direction of the base 21 corresponds to direction X. A pair of guide grooves 22, which extend in direction X, are defined in an upper surface of the base 21. A substrate stage 23, which serves as a transporting device, is provided on the base 21. The substrate stage 23 is operably connected to an X-axis motor MX (see FIG. 6) that is provided on the base 21 and translated and slides along the guide grooves 22 in direction X at a predetermined speed (transport speed Vx). A suction type chuck mechanism (not illustrated) is arranged on the substrate stage 23. The substrate 2 is positioned and fixed to an upper surface of the substrate stage 23 with the surface 2*a* (the code formation area S) facing upward.

A guide member 24 extends in direction Y of the base 21. As viewed in direction X, the guide member 24 is shaped like a gate. A reservoir tank 25 is provided on the guide member 24. The reservoir tank 25 retains the liquid F and supplies the liquid F to an ejection head 32. A pair of guide rails 26 are formed below the guide member 24, extending along the entire width of the guide member 24 in direction Y. A carriage 27 is operably connected to a Y-axis motor MY (see FIG. 6) that is provided on the guide member 24 and linearly moves on the guide rails 26.

Figure 4:
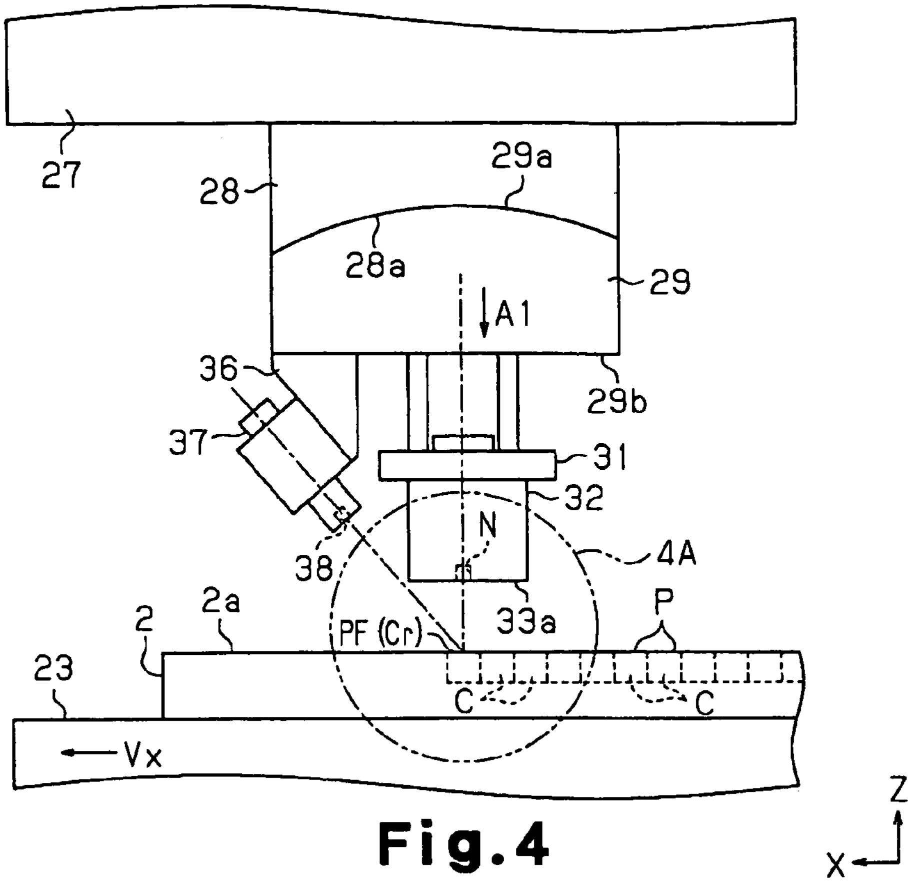
FIG. 4 is a view illustrating the ejection head of FIG. 3.

As illustrated in FIG. 4, a guide member 28 is located on a lower surface of the carriage 27. The guide member 28 has a parallelepiped shape and extends in direction Y. The guide member 28 has a guide surface 28*a*, which is formed substantially along the entire width of the carriage 27 in direction Y. The guide surface 28*a* is a concave surface shaped in an arcuate manner having a center of radius Cr located on the surface 2*a* of the substrate 2.

A pivot stage 29, which extends in direction Y, is provided on the guide surface 28*a* of the guide member 28. The pivot stage 29 forms a pivot device. The pivot stage 29 has a convex surface opposed to the guide surface 28*a*, or a sliding surface 29*a*, at the side corresponding to the guide member 28. The pivot stage 29 also has a flat surface extending along the surface 2*a* of the substrate 2, or a stage surface 29*b*, at the side corresponding to the substrate stage 23. The pivot stage 29 is operably connected to a pivot motor MR (see FIG. 6) through a worm gear (not illustrated) formed in the guide member 28. The pivot stage 29 operates in such a manner that the sliding surface 29*a* slides on or pivots along the guide surface 28*a*. In other words, the stage surface 29*b* of the pivot stage 29 pivots about the center of radius Cr in such a manner that the sliding surface 29*a* and the guide surface 28*a* become flush.

Figure 5:
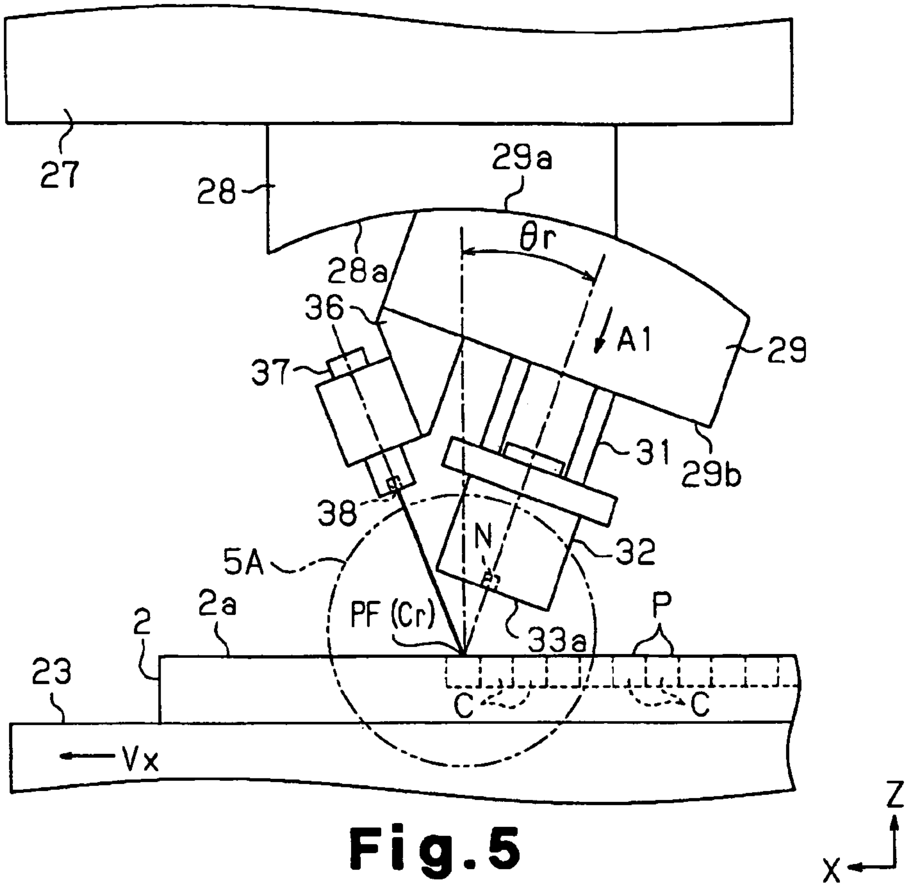
FIG. 5 is a view illustrating the ejection head of FIG. 3.

In the illustrated embodiment, as illustrated in FIG. 4, the reference position of the pivot stage 29 corresponds to the position of the pivot stage 29 at which the sliding surface 29*a* coincides with the guide surface 28*a*. Further, as illustrated in FIG. 5, the imaging position of the pivot stage 29 corresponds to the position of the pivot stage 29 with the sliding surface 29*a* pivoted clockwise at a predetermined angle (the pivot angle $\theta r$).

Figure 3:
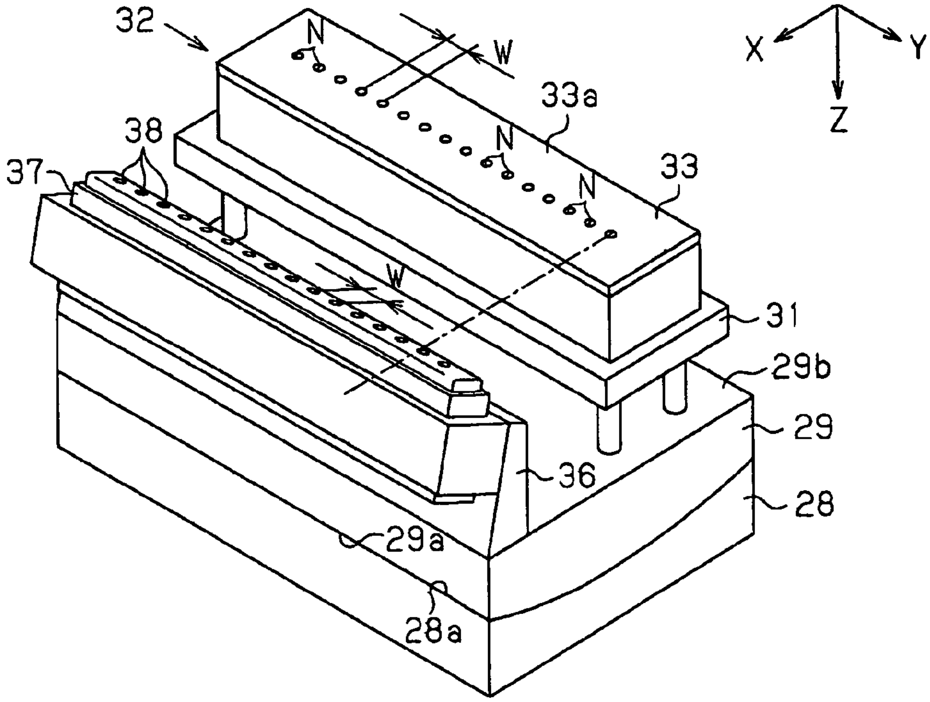
FIG. 3 is a perspective view schematically illustrating an ejection head according to a first embodiment of the present invention.

As illustrated in FIG. 3, a plate-like support member 31 connected to legs is provided on the stage surface 29*b* of the pivot stage 29. The legs extend toward the substrate 2, or in direction −Z. The ejection head 32 is supported by the support member 31 at the side corresponding to the substrate 2, or at a position in direction −Z from the support member 31.

A nozzle plate 33 is formed on an upper surface of the ejection head 32 as viewed in FIG. 3. The nozzle plate 33 has a nozzle-forming surface 33*a* parallel with the stage surface 29*b* at the side corresponding to the substrate 2. Sixteen circular bores, or nozzles N, are defined in the nozzle-forming surface 33*a* and spaced at equal intervals (the pitch width corresponding to the cell width W) in direction Y.

With reference to FIG. 4, each of the nozzles N extends in a normal direction of the nozzle-forming surface 33*a* and in a radial direction of the sliding surface 29*a*. In FIG. 4, the ejecting direction A1 corresponds to the radial direction of the sliding surface 29*a*, or an orienting direction of each nozzle N. The droplet receiving position PF corresponds to the center of radius Cr and is a position on the surface 2*a* at which a droplet Fb is received by the substrate 2.

Figure 4A:
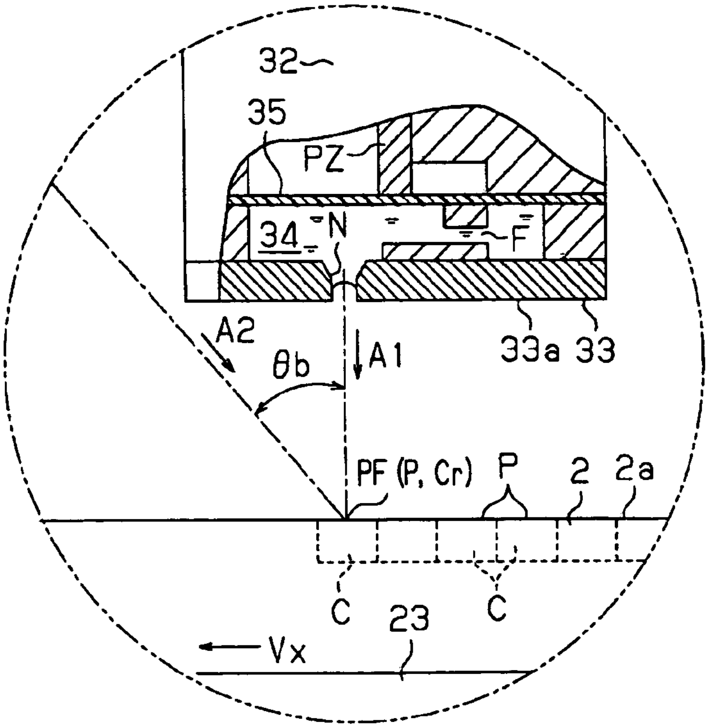
FIG. 4A is an enlarged partial view of a part of FIG. 4 indicated by a circle 4A.

As illustrated in FIG. 4A, a cavity 34 is defined above each of the nozzles N and communicates with the reservoir tank 25. Each of the cavities 34 supplies the liquid F from the reservoir tank 25 to the corresponding one of the nozzles N. An oscillation plate 35 is attached with the upper surfaces of the walls defining each of the cavities 34. Each of the oscillation plates 35 oscillates in an upward-downward direction and increases or reduces the volume of the corresponding one of the cavities 34. Sixteen piezoelectric elements PZ, which correspond to nozzles N respectively, are arranged on the oscillation plates 35. Each of the piezoelectric elements PZ is excited in response to a signal for controlling actuation of the piezoelectric element PZ (piezoelectric element drive voltage COM1: see FIG. 6), and causes oscillation of the corresponding one of the oscillation plates 35 in the upward-downward direction. The droplets Fb are then ejected from the corresponding nozzles N in the ejection direction A1.

A signal (a pivot motor signal SMR: see FIG. 6) for pivoting the pivot stage 29 from the reference position to the imaging position is sent to the pivot motor MR, which causes forward rotation of the pivot motor MR. This pivots the stage surface 29*b* of the pivot stage 29 (the nozzle-forming surface 33*a*) clockwise about the droplet receiving position PF, the pivot center, at the pivot angle θr. In this manner, as illustrated in FIG. 5, the distance between the ejection head 32 (the nozzle-forming surface 33*a*) and the substrate 2 in which the laser head 37 is provided is enlarged at the side of +Z direction of the ejection head 32 or at the side corresponding to the laser head 37. The laser head 37 serves as a laser-irradiating device.

Figure 5A:
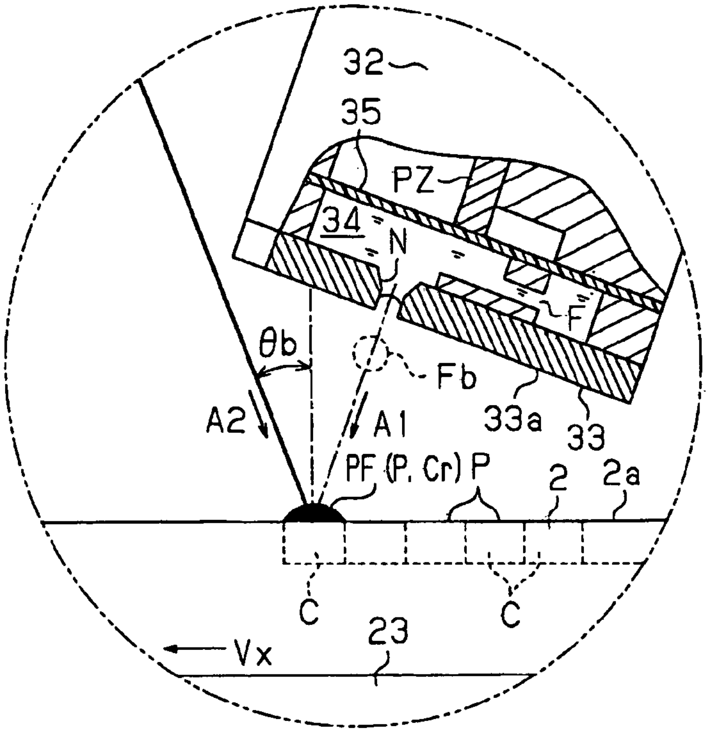
FIG. 5A is an enlarged partial view of a part of FIG. 5 indicated by a circle 5A.

Subsequently, in correspondence with the timing at which the ejection target positions P of the data cells C reach the corresponding droplet receiving positions PF, the piezoelectric element drive voltage COM 1 is supplied to the corresponding piezoelectric elements PZ. As shown in FIG. 5A, the piezoelectric elements PZ then causes the droplets Fb to travel from the nozzles N in the ejecting direction A1 (in a radial inward direction of the sliding surface 29*a*). Since the droplets Fb travel along direction A1, the droplets reach the corresponding droplet receiving positions PF regardless of the measure of the pivot angle θr. The droplets Fb then spread wet on the surface 2*a*. The outer diameter of each droplet Fb coincides with the cell width W.

Accordingly, the ejection head 32 enlarges the distance between the nozzle-forming surface 33*a* and the substrate 2 at the side corresponding to the laser head 37, while maintaining the position accuracy of reception of the droplets Fb by the substrate 2.

Referring to FIG. 3, a substantially triangular prism-like support member 36, which extends in direction Y, is located on the stage surface 29*b* of the pivot stage 29 at a position in direction +X from the ejection head 32. The laser head 37, which extends in direction Y and has a parallelepiped shape, is supported by the side of the support member 36 corresponding to the substrate 2, or at a position in direction −Z from the support member 36.

Semiconductor lasers LD (see FIG. 6) are provided in the laser head 37 in correspondence with the nozzles N. Upon receiving a signal (laser drive voltage COM2: see FIG. 6) for driving the semiconductor lasers LD, each of the semiconductor lasers LD radiates laser beams having a wavelength range corresponding to absorption wavelength of each droplet Fb. The laser head 37, on the side corresponding to the substrate, defines sixteen radiation ports 38 that are spaced at equal intervals (the pitch width corresponding to the cell width W) in direction Y. The radiation ports 38 correspond to the respective nozzles N.

With reference to FIG. 4, each of radiation ports 38 defines an optical axis extending toward the corresponding droplet receiving position PF in a radial direction of the sliding surface 29*a*. A laser beam B (see FIG. 5) is radiated from each port 38 along the optical axis.

As illustrated in FIG. 4A, the radiating direction A2 corresponds to the optical axis, which passes through the corresponding radiation port 38. The radiation angle θb is the angle between the radiating direction A2 and the normal direction of the surface 2*a*.

As the pivot stage 29 pivots from the reference position to the imaging position, each of the radiation ports 38 pivots clockwise about the corresponding droplet receiving position PF, the pivot center. As a result, the radiating direction A2 approximates to the normal direction of the substrate 2 and the radiation angle θb decreases by the amount corresponding to the pivot angle θr.

Subsequently, in correspondence with the timing at which the ejection target positions P of the data cells C reach the corresponding droplet receiving positions PF, the laser drive voltage COM2 is supplied to the corresponding semiconductor lasers LD. The lasers LD then radiates laser beam B from each of the associated radiation ports 38 in the radiating direction A2.

By this time, the distance between the nozzle-forming surface 33*a* and the substrate 2 has been enlarged in the vicinity of the laser head 37 through pivoting of the ejection head 32. Therefore, the laser beam B proceeding in the radiating direction A2 is radiated onto the corresponding droplet receiving position PF (the corresponding ejection target position P), or the pivot center, without being blocked by the ejection head 32. In other words, the radiation angle θb of the laser beam B is decreased while the its irradiated location is kept on the location PF, whereby the zone corresponding to the droplet Fb (the outer diameter of which coincides with the cell width W) is irradiated. Thus, the laser head 37 may vary the radiation angle θb or energy density of the laser beam B while maintaining the radiating position and the position accuracy.

In this manner, the laser head 37 may always irradiate the zone corresponding to the droplets Fb with the laser beam B having a decreased angle θb (the increased energy density) by the amount corresponding to the pivot angle θr. The laser head 37 provides sufficient drying of the droplets Fb, allowing dots D having the outer diameter coinciding with the cell width W formed in the corresponding data cells C.

The electric configuration of the liquid ejection apparatus 20 will hereafter be described with reference to FIG. 6.

Figure 6:
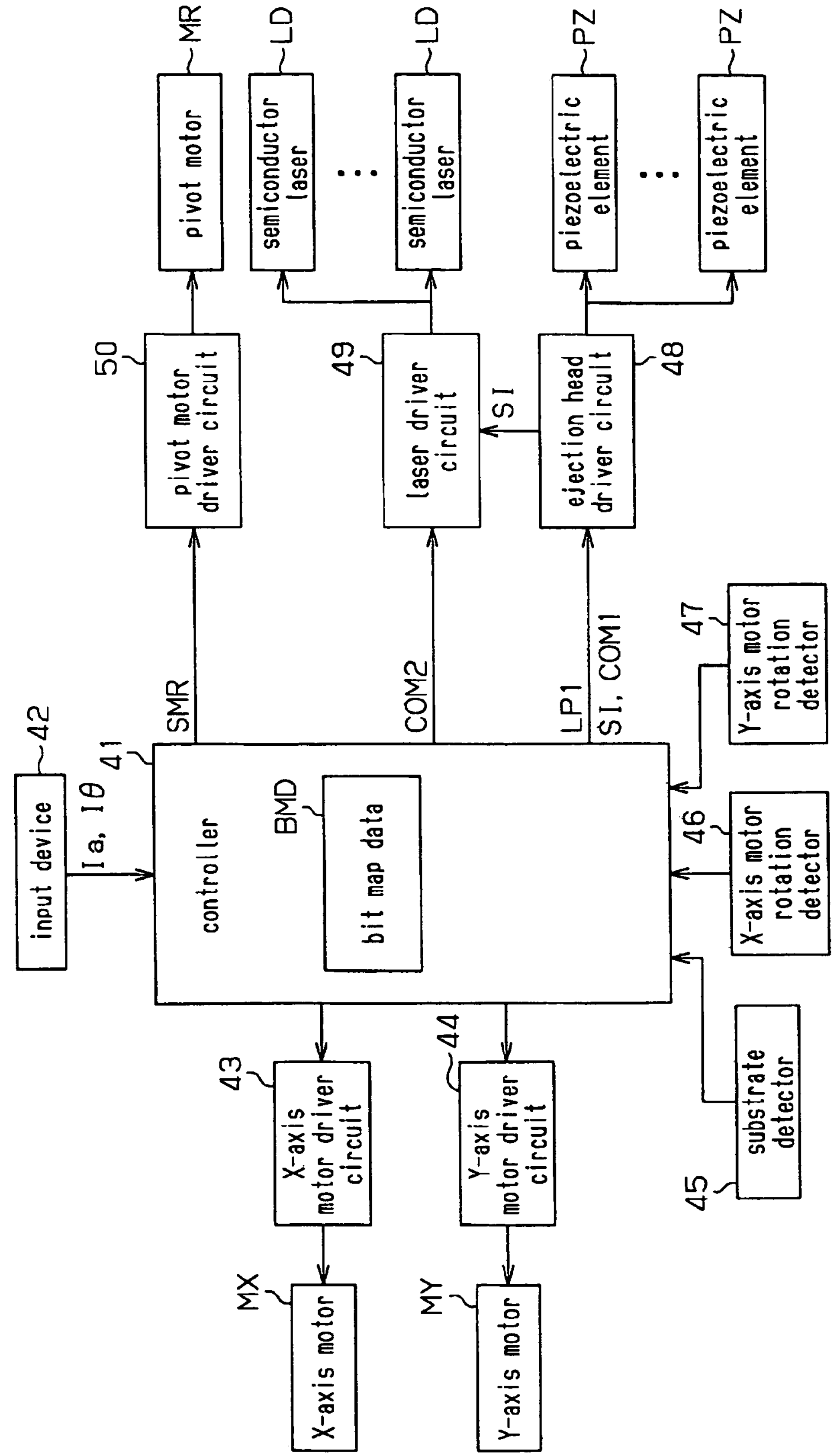
FIG. 6 is a block diagram representing the electric configuration of the liquid ejection apparatus.

Referring to FIG. 6, a controller 41 includes a CPU, a RAM, and a ROM. The ROM stores various data and various control programs. The controller 41 transports the substrate stage 23 and operates the ejection head 32, the laser head 37, and the pivot stage 29 in correspondence with the data and in accordance with the control programs.

An input device 42 including manipulation switches such as a start switch or a stop switch is connected to the controller 41. An image of the identification code 10 is input from the input device 42 to the controller 41 as a prescribed form of imaging data Ia. The pivot angle θr of the pivot stage 29 is also input from the input device 42 to the controller 41 as a prescribed form of pivot angle data Iθ. In correspondence with the imaging data Ia input from the input device 42, the controller 41 generates bit map data BMD, the piezoelectric element drive voltage COM1, and the laser drive voltage COM2. Further, the input device 42 generates a pivot motor drive signal SMR in correspondence with the pivot angle data Iθ input from the input device 42.

The bit map data BMD indicates whether to excite the piezoelectric elements PZ in correspondence with the corresponding bit values (0 or 1). That is, the bit map data BMD indicates whether to eject the droplets Fb onto the data cells C defined in a two-dimensional imaging surface (the code formation area S).

The controller 41 is connected to an X-axis motor driver circuit 43 and outputs a corresponding control signal to the X-axis motor driver circuit 43. In correspondence with the control signal of the controller 41, the X-axis motor driver circuit 43 operates to rotate the X-axis motor MX in a forward direction or a reverse direction. The controller 41 is connected to a Y-axis motor driver circuit 44 and outputs a corresponding control signal to the Y-axis motor driver circuit 44. In correspondence with the control signal of the controller 41, the Y-axis motor driver circuit 44 operates to rotate the Y-axis motor MY in a forward direction or a reverse direction. The controller 41 is connected to a substrate detector 45 capable of detecting an end of the substrate 2. The controller 41 calculates the position of the substrate 2 that is passing the droplet receiving position PF, based on a detection signal generated by the substrate detector 45.

An X-axis motor rotation detector 46 is connected to the controller 41 and sends a detection signal to the controller 41. In correspondence with the detection signal of the X-axis motor rotation detector 46, the controller 41 calculates the movement direction and the movement amount (the current position) of the substrate stage 23 (the substrate 2). The controller 41 sends an ejection timing signal LP1 to an ejection head driver circuit 48 when the center of each data cell C coincides with the corresponding droplet receiving position PF.

A Y-axis motor rotation detector 47 is connected to the controller 41 and outputs a detection signal to the controller 41. In correspondence with the detection signal of the Y-axis motor rotation detector 47, the controller 41 calculates the movement direction and the movement amount (the current position) of the ejection head 32 (the laser head 37) in direction Y. The controller 41 then operates in such a manner that the droplet receiving positions PF corresponding to the nozzles N are located on the movement paths of the corresponding ejection target positions P.

The controller 41 is connected to an ejection head driver circuit 48 and provides an ejection timing signal LP1 to the ejection head driver circuit 48. The controller 41 synchronizes the piezoelectric element drive voltage COM1 with a prescribed clock signal and supplies the piezoelectric element drive voltage COM1 to the ejection head driver circuit 48. Further, the controller 41 generates ejection control signals SI synchronized with a prescribed reference clock signal based on the bit map data BMD and serially transfers the ejection control signals SI to the ejection head driver circuit 48. The ejection head driver circuit 48 converts the serial ejection control signals SI from the controller 41 to the parallel signals corresponding to the piezoelectric elements PZ.

Upon receiving the ejection timing signal LP1 from the controller 41, the ejection head driver circuit 48 supplies the piezoelectric element drive voltage COM1 to the piezoelectric elements PZ that are selected in correspondence with the ejection control signals SI. Further, the ejection head driver circuit 48 outputs the parallel ejection control signals SI, which have been converted from the serial signals, to a laser driver circuit 49.

The controller 41 is connected to the laser driver circuit 49 and outputs the laser drive voltage COM2 to the laser driver circuit 49 synchronously with a prescribed clock signal.

Upon receiving the ejection control signals SI from the ejection head driver circuit 48, the laser driver circuit 49 waits a predetermined time (radiation standby time) and then supplies the laser drive voltage COM2 to the respective semiconductor lasers LD corresponding to the ejection control signals SI. In other words, every time the droplets Fb on the substrate 2 reach the radiation target positions PT, the controller 41 operates the laser driver circuit 49 to radiate the laser beams B onto the zones where the droplets Fb are disposed.

The controller 41 is connected to a pivot motor driver circuit 50 and sends a pivot motor drive signal SMR to the pivot motor driver circuit 50. In response to the pivot motor drive signal SMR from the controller 41, the pivot motor driver circuit 50 operates to rotate the pivot motor MR, which drives the pivot stage 29 to pivot, in a forward or reverse direction. In this manner, the pivot stage 29 (the radiation ports 37*a* are) pivoted at the pivot angle θr.

A method for forming the identification code 10 using the liquid ejection apparatus 20 will hereafter be described.

First, as illustrated in FIG. 2, the substrate 2 is fixed to the substrate stage 23 with the surface 2*a* facing upward. At this stage, the substrate 2 is located on the side of direction −X with respect to the guide member 24 (the carriage 27). The pivot stage 29 is arranged at the reference position.

The input device 42 is then manipulated to input the imaging data Ia and the pivot angle data Iθ to the controller 41. The controller 41 then generates and stores the bit map data BMD in correspondence with the imaging data Ia and produces the piezoelectric element drive voltage COM1 and the laser drive voltage COM2. Subsequently, the controller 41 starts operating the Y-axis motor MY. The carriage 27 is (the nozzles N are) thus set at a position (positions) in direction Y in such a manner that, when the substrate 2 is transported in direction +X, the ejection target positions P pass the corresponding droplet receiving positions PF.

Further, the controller 41 generates the pivot motor drive signal SMR based on the pivot angle data Iθ and outputs the pivot motor drive signal SMR to the pivot motor driver circuit 50. The controller 41 then operates the pivot motor driver circuit 50 to rotate the pivot motor MR in the forward direction, thus pivoting the pivot stage 29 from the reference position to the radiating position. In this manner, while maintaining the position at which the droplet Fb from each nozzle N is received by the substrate 2 and the radiating position of the laser beam B from each radiation port 38 commonly at the corresponding droplet receiving position PT, the radiation angle θb of each laser beam B is decreased by the amount corresponding to the pivot angle θr independently.

After having pivoted the pivot stage 29 to the radiating position, the controller 41 operates the X-axis motor MX to start transportation of the substrate 2 in direction +X. The controller 41 determines whether the ejection target positions P of the foremost ones of the data cells C in direction X have reached the positions immediately below the nozzles N, in correspondence with the detection signals of the substrate detector 45 and the X-axis motor rotation detector 46.

Meanwhile, the controller 41 outputs the ejection control signals SI to the ejection head driver circuit 48 and supplies the piezoelectric drive voltage COM1 and the laser drive voltage COM2 to the ejection head driver circuit 48 and the laser driver circuit 49, respectively.

When the ejection target positions P of the foremost ones of the data cells C in direction +X reach the corresponding droplet receiving positions PF, the controller 41 outputs the ejection timing signal LP1 to the ejection head driver circuit 48.

After having sent the ejection timing signal LP1 to the ejection head driver circuit 48, the controller 41 operates the ejection head driver circuit 48 to supply the piezoelectric element drive voltage COM1 to the piezoelectric elements PZ selected based on the ejection control signals SI. In this manner, the corresponding nozzles N are caused to simultaneously eject the droplets Fb. The droplets Fb are then received by the substrate 2 at the corresponding ejection target positions P. The droplets Fb spread wet in the corresponding data cells C as time elapses. By the time the radiation standby time elapses since starting of ejection, the outer diameter of the droplets Fb in the droplet receiving position PF becomes the cell width W.

Further, after having output the ejection timing signal LP1 to the ejection head driver circuit 48, the controller 41 supplies the laser drive voltage COM2 to the semiconductor lasers LD selected in correspondence with the ejection control signals SI from the ejection head driver circuit 48. The controller 41 thus operates to simultaneously radiate the laser beams B from the selected semiconductor lasers LD.

The radiation angle θ of the laser beams B from the semiconductor lasers LD is decreased by the amount corresponding to the pivot angle θr, which increases the energy density of the laser beams B with respect to the corresponding droplets Fb. In this manner, while avoiding insufficiency of radiation energy of the laser beams B with respect to the droplets Fb, or insufficient drying of the droplets Fb, the laser beams B form dots D having the outer diameter coinciding with the cell width W on the surface 2*a* of the substrate 2. That is, the controller 41 allows forming the dots D sized in correspondence with the cell width W in the first data cells C in direction +X.

Thereafter, the controller 41 operates to continuously transport the substrate 2 in direction +X. Each time the ejection target positions P reach the corresponding droplet receiving positions PF, the controller 41 causes simultaneous ejection of the droplets Fb from the selected nozzles N. Then, when each droplet Fb reaches the size corresponding to the cell width W, the laser beams B are radiated onto the zones corresponding to the droplets Fb. In this manner, all of the necessary dots D are provided in the code formation area S.

The first embodiment, which is configured as above-described, has the following advantages.

The pivot stage 29 is provided in the carriage 27 and pivots about the pivot axis coinciding with the droplet receiving position PF. The pivot stage 29 includes the ejection head 32 and the laser head 37. The droplets Fb are ejected from the nozzles N of the ejection head 32 to the position PF in the ejecting direction A1. The laser beams B radiates the ejected droplets Fb from the ejection ports 38 of the laser head 37 to the position PF in the radiating direction A2. In other words, the droplet receiving position PF is located at the intersection of trajectory of the droplets Fb from each nozzle N in direction A1 and optical axis of the laser beam B irradiated from the corresponding radiation port 38 in direction A2.

Accordingly, when adjusting the radiation angle θb of each laser beam B, the position at which the droplet Fb is received by the substrate 2 and the radiating position of the laser beam B are maintained at the droplet receiving position PF. As a result, the radiation angle θb of each laser beam B is adjusted independently, while maintaining the position accuracy of reception of the ejected droplet Fb and that of radiation of the laser beam B. This allows more flexible setting of the conditions for radiating the laser beams B, thereby enhancing the controllability for shaping the dots D formed by the droplets Fb. Further, by pivoting the pivot stage 29 clockwise, the radiation angle θb of each laser beam B is decreased by the amount corresponding to the pivot angle θr. The optical axis of the laser beam B thus approximates to the normal line of the substrate 2. This correspondingly increases the energy density of the laser beam B with respect to the corresponding droplet Fb. Insufficient drying of the droplets Fb is thus avoided.

The pivot stage 29 is provided in the carriage 27. Accordingly, the radiation angle θb of each laser beam B may be simply adjusted in any location on the surface 2*a*.

The laser head 37 and the ejection head 32 are secured commonly to the pivot stage 29. Thus, the relative position between the laser beam B and the ejection head 32 may be maintained. Accordingly, in adjustment of the radiation angle θb of the laser beam B, the ejection head 32 can be maintained outside the optical path of the laser beam B.

The illustrated embodiments may be modified as follows.

The radiation angle θb may be set to zero degrees. This maximizes the energy density of the laser beam B radiated onto the corresponding droplet Fb. Insufficient drying of the droplets Fb thus can be avoided further reliably.

Alternatively, the radiation angle θb may be increased by pivoting the pivot stage 29 counterclockwise. This enlarges the optical cross section of the laser beam B radiated onto the corresponding droplet Fb on the surface of the substrate and decreases the energy density of the laser beam B. In this manner, bumping of the droplet Fb caused by radiation of the laser beam B is avoided. The droplet Fb is thus smoothly dried and baked.

Specifically, the pivot angle θr may be set to any suitable value in accordance with the conditions for drying the droplets Fb.

Further, instead of securing the laser head 37 and the ejection head 32 commonly to the pivot stage 29, the laser head 37 and the ejection head 32 may be secured separately to different pivot stages. In this case, the pivot centers of the laser head 37 and the ejection head 32 commonly correspond to the ejection target position P.

Instead of drying and baking the droplets Fb by the laser beams B, the droplets Fb may be caused to flow in a desired direction by the energy produced by the laser beams B. Alternatively, the droplets Fb may be subjected to pinning by restricting radiation of the laser beams B to the outer peripheral portions of the droplets Fb. That is, any other suitable process may be employed as long as marks are formed through radiation of the laser beams B.

The marks formed with dots D are not restricted to the semispherical shapes but may be modified to oval dots or a linear mark.

Instead of the dots D of the identification code 10, the mark may be embodied as different types of thin films, metal wiring, or color filters of a liquid crystal display, an organic electroluminescence display, or a field effect type device (an FED or SED) having a flat electron emitting device. In other words, the mark may be embodied in any other suitable forms as long as the mark is provided through ejection of the droplets Fb. The field effect type device emits light from a fluorescent substance by radiating electrons emitted by the electron emitting device onto the fluorescent substance.

The substrate 2 may be a silicone substrate, a flexible substrate, or a metal substrate. The surface 2*a* onto which the droplets Fb are ejected may be one of the surfaces of these substrates. That is, the surface 2*a* may be any other suitable surface as long as the surface is one of the surfaces of an object on which a mark is formed through ejection of the droplets Fb.

Therefore, the present examples and embodiments are to be considered as illustrative and not restrictive and the invention is not to be limited to the details given herein, but may be modified within the scope and equivalence of the appended claims.

What is claimed is:

1. A method for forming a mark comprising:

ejecting a droplet of a liquid from a nozzle onto an ejection target position on a surface of an object along an ejecting direction;

radiating a laser beam from a radiation port onto the ejection target position along a radiating direction; and pivoting the nozzle and the radiation port together about the ejection target position as a pivot center, thereby changing the angle between a normal line of the surface of the object and the ejecting direction and the angle between the normal line and the radiating direction while maintaining the angle between the ejecting direction and the radiating direction.

2. The method according to claim 1, wherein the nozzle and the radiation port are pivoted together in such a manner that the radiating direction becomes substantially parallel with the normal line.

* * * * *